(12) United States Patent
Kumar et al.

(10) Patent No.: US 11,645,103 B2
(45) Date of Patent: May 9, 2023

(54) METHOD AND SYSTEM FOR SECURING THE MOVEMENT OF VIRTUAL MACHINES BETWEEN HOSTS

(71) Applicant: EMC IP Holding Company LLC, Hopkinton, MA (US)

(72) Inventors: Suren Kumar, Tamil Nadu (IN); Vinod Durairaj, Bangalore (IN); Veena Rao, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 378 days.

(21) Appl. No.: 16/936,465

(22) Filed: Jul. 23, 2020

(65) Prior Publication Data

US 2022/0027184 A1 Jan. 27, 2022

(51) Int. Cl.
*H04L 29/06* (2006.01)
*G06F 9/455* (2018.01)
*H04L 9/40* (2022.01)
*H04L 9/08* (2006.01)

(52) U.S. Cl.
CPC ........ *G06F 9/45558* (2013.01); *H04L 9/0825* (2013.01); *H04L 63/0428* (2013.01); *G06F 2009/4557* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,898,402 B1 * | 11/2014 | Stronge | G06F 3/0605 711/100 |
| 9,110,693 B1 * | 8/2015 | Meiri | G06F 9/45558 |
| 9,292,327 B1 * | 3/2016 | von Thenen | G06F 11/1451 |
| 10,404,674 B1 * | 9/2019 | Bshara | H04L 9/0894 |
| 11,444,765 B2 * | 9/2022 | Nirwal | H04L 63/068 |
| 11,451,560 B2 * | 9/2022 | Sheth | H04L 63/06 |
| 2013/0097296 A1 * | 4/2013 | Gehrmann | G06F 9/4856 709/223 |
| 2014/0040886 A1 * | 2/2014 | Coles | G06F 21/53 718/1 |
| 2015/0220356 A1 * | 8/2015 | Khesin | G06F 9/45558 718/1 |
| 2017/0003996 A1 * | 1/2017 | Bacher | G06F 12/145 |
| 2017/0004003 A1 * | 1/2017 | Coles | G06F 21/556 |
| 2017/0250963 A1 * | 8/2017 | Birger | G06F 9/45558 |
| 2018/0183580 A1 * | 6/2018 | Scarlata | G06F 21/53 |
| 2019/0155728 A1 * | 5/2019 | Ferguson | G06F 21/6281 |

(Continued)

*Primary Examiner* — Jeffery L Williams
(74) *Attorney, Agent, or Firm* — Chamberlain, Hrdlicka, White, Williams & Aughtry

(57) ABSTRACT

A method for securing the movement of virtual machines (VMs) between hosts. The method includes obtaining a first VM movement request; in response to obtaining the first VM movement request, identifying a first VM of the VMs and a first targeted host of the hosts associated with the first VM movement request using VM metadata and host metadata; making a first determination that the first targeted host is registered; in response to making the first determination, initiating the movement of the first VM to the first targeted host; and initiating, after the movement of the first VM, encryption of communication between the first VM and the first targeted host.

20 Claims, 11 Drawing Sheets

(56) References Cited

U.S. PATENT DOCUMENTS

| | | | |
|---|---|---|---|
| 2019/0229987 A1* | 7/2019 | Shelke | H04L 41/122 |
| 2021/0143999 A1* | 5/2021 | Nirwal | H04L 63/06 |
| 2021/0200645 A1* | 7/2021 | Luo | G06F 11/1464 |
| 2021/0334222 A1* | 10/2021 | Wood | G06F 21/602 |
| 2022/0019698 A1* | 1/2022 | Durham | G06F 21/71 |
| 2022/0027184 A1* | 1/2022 | Kumar | H04L 63/0823 |
| 2022/0272076 A1* | 8/2022 | Pappachan | H04L 9/0841 |

* cited by examiner

METHOD AND SYSTEM FOR SECURING THE MOVEMENT OF VIRTUAL MACHINES BETWEEN HOSTS

BACKGROUND

Devices may generate information based on existing information. For example, devices may obtain information and derive information based on the obtained information. To obtain information, devices may be able to communicate with other devices. The communications between devices may be through any means.

SUMMARY

In general, in one aspect, the invention relates to a method for securing the movement of virtual machines (VMs) between hosts. The method includes obtaining a first VM movement request; in response to obtaining the first VM movement request, identifying a first VM of the VMs and a first targeted host of the hosts associated with the first VM movement request using VM metadata and host metadata; making a first determination that the first targeted host is registered; in response to making the first determination, initiating the movement of the first VM to the first targeted host; and initiating, after the movement of the first VM, encryption of communication between the first VM and the first targeted host.

In general, in one aspect, the invention relates to a system for securing the movement of virtual machines (VMs) between hosts. The system includes hosts for hosting VMs. The system also includes a data manager for obtaining a first VM movement request; in response to obtaining the first VM movement request, identifying a first VM of the VMs and a first targeted host of the hosts associated with the first VM movement request using VM metadata and host metadata; making a first determination that the first targeted host is registered; in response to making the first determination, initiating the movement of the first VM to the first targeted host; and initiating, after the movement of the first VM, encryption of communication between the first VM and the first targeted host.

In general, in one aspect, the invention relates to a non-transitory computer readable medium which includes computer readable program code, which when executed by a computer processor enables the computer processor to perform a method. The method includes obtaining a first VM movement request; in response to obtaining the first VM movement request, identifying a first VM of the VMs and a first targeted host of the hosts associated with the first VM movement request using VM metadata and host metadata; making a first determination that the first targeted host is registered; in response to making the first determination, initiating the movement of the first VM to the first targeted host; and initiating, after the movement of the first VM, encryption of communication between the first VM and the first targeted host.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for securing the movement of virtual machines (VMs) between hosts. More specifically, embodiments of the invention relate to a data manager that registers hosts in a system and permits the movement of VMs to registered hosts and blocks the movement of VMs to unregistered hosts. Embodiments of the invention further include a data manager initiating the generation of an encrypted communication channel between the VMs and their respective hosts. As a result, VMs may be safely moved between hosts in a system and the security of the VMs may be improved.

Figure 1A:
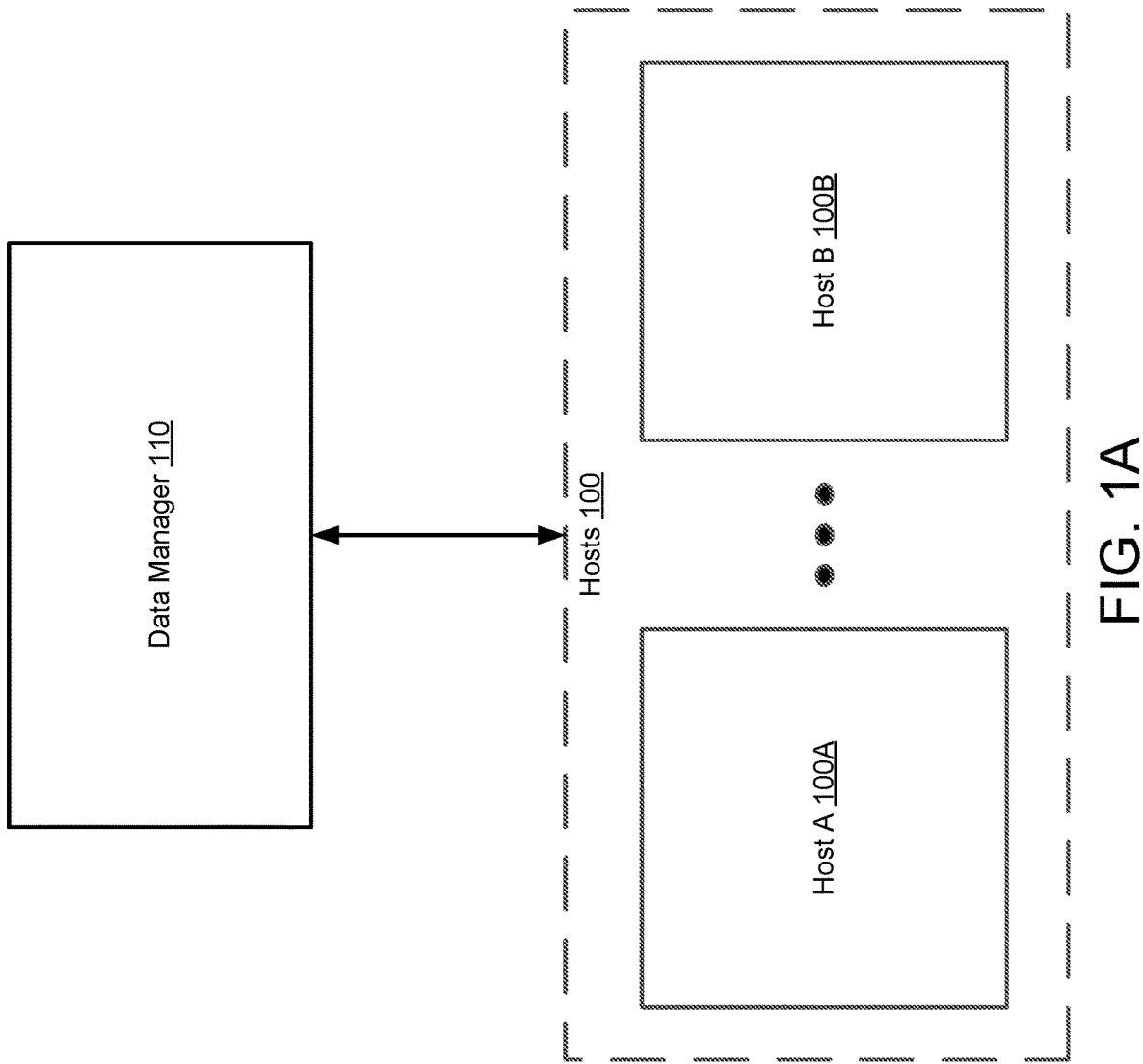
FIG. 1A shows a diagram of a system in accordance with one or more embodiments of the invention.

FIG. 1A shows a system in accordance with one or more embodiments of the invention. The system may include one or more hosts (100), and a data manager (110). There may be any number of hosts (e.g., host A (100A), host B (100B)). The hosts (100) and the data manager (110) may be operatively connected to each other via any combination of wired and/or wireless connections. The system may include other and/or additional components without departing from the invention. Each of the components is described below.

In one or more embodiments of the invention, the hosts (100) may provide virtual machine (VM) hosting services for VMs. The VMs may be logical entities executed using computing resources (not shown) of the hosts (100). Each of the hosts (100) may host (i.e., have executing thereon) one or more VMs. The hosts (100) may obtain VM management and security services from the data manager (110). As a result of obtaining the aforementioned services, the hosts (100) may provide and/or obtain data to and/or from the data manager (110). Additionally, the hosts (100) may perform actions based on requests obtained from the data manager (110). The hosts may obtain and/or provide other and/or additional services without departing from the invention. For additional information regarding the hosts (100), refer to FIG. 1C.

Figure 5:
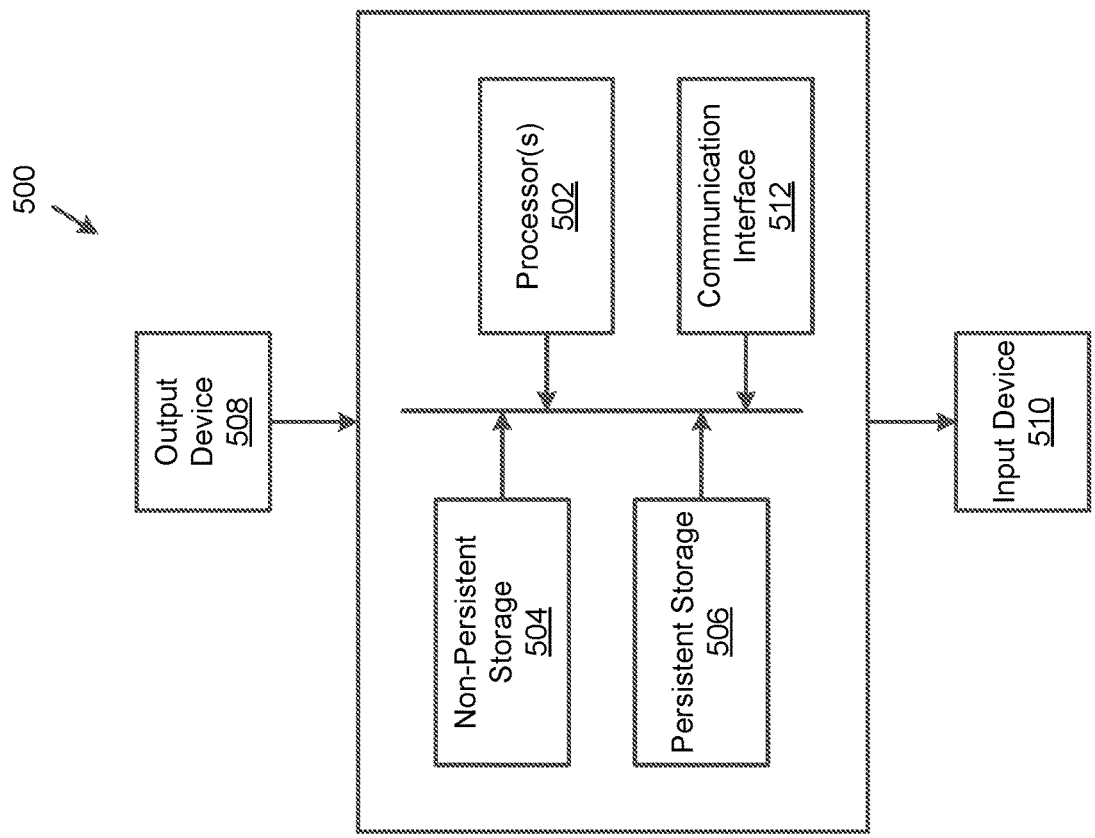
FIG. 5 shows a computing device in accordance with one or more embodiments of the invention.

In one or more embodiments of the invention, each of the hosts (e.g., 100A, 100B) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (e.g., 100A, 100B) described throughout this application.

In one or more embodiments of the invention, each of the hosts (e.g., 100A, 100B) is implemented as a logical device. The logical device may utilize the computing resources of any number of computing devices and thereby provide the functionality of the host (e.g., 100A, 100B) described throughout this application. For additional information regarding the hosts (100), refer to FIG. 1C.

In one or more embodiments of the invention, the data manager (110) provides VM management and security services to the hosts (100). The VM management and security services provided by the data manager (110) may include: (i) permitting the movement of VMs to hosts (100) that have registered, (ii) blocking the movement of VMs to hosts (100) that have not registered, and (iii) initiating the encryption of communication channels between VMs and hosts (100). The movement of VMs may refer to: (i) moving a VM from first host (e.g., 100A) to a second host (100B), where the VM is no longer hosted by the first host (100A), and (ii) copying a VM from a first host (e.g., 100A) and moving the VM copy to a second host (e.g., 100B). The VM management and security services may further include registering hosts, tracking VMs hosted by the hosts (100), and determining VMs that require the generation of an encrypted communication channel. The data manager (110) may provide other and/or additional services to other and/or additional entities without departing from the invention. For additional information regarding the data manager, refer to FIG. 1B.

In one or more embodiments of the invention, the data manager (110) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data manager (110) described throughout this application and/or all, or a portion thereof, of the methods illustrated in FIGS. 3A-3C.

In one or more embodiments of the invention, the data manager (110) is implemented as a logical device. The logical device may utilize the computing resources of any number of computing devices and thereby provide the functionality of the data manager (110) described throughout this application and/or all, or a portion thereof, of the methods illustrated in FIGS. 3A-3C. For additional details regarding the data manager (110), see, e.g., FIG. 1B.

Figure 1B:
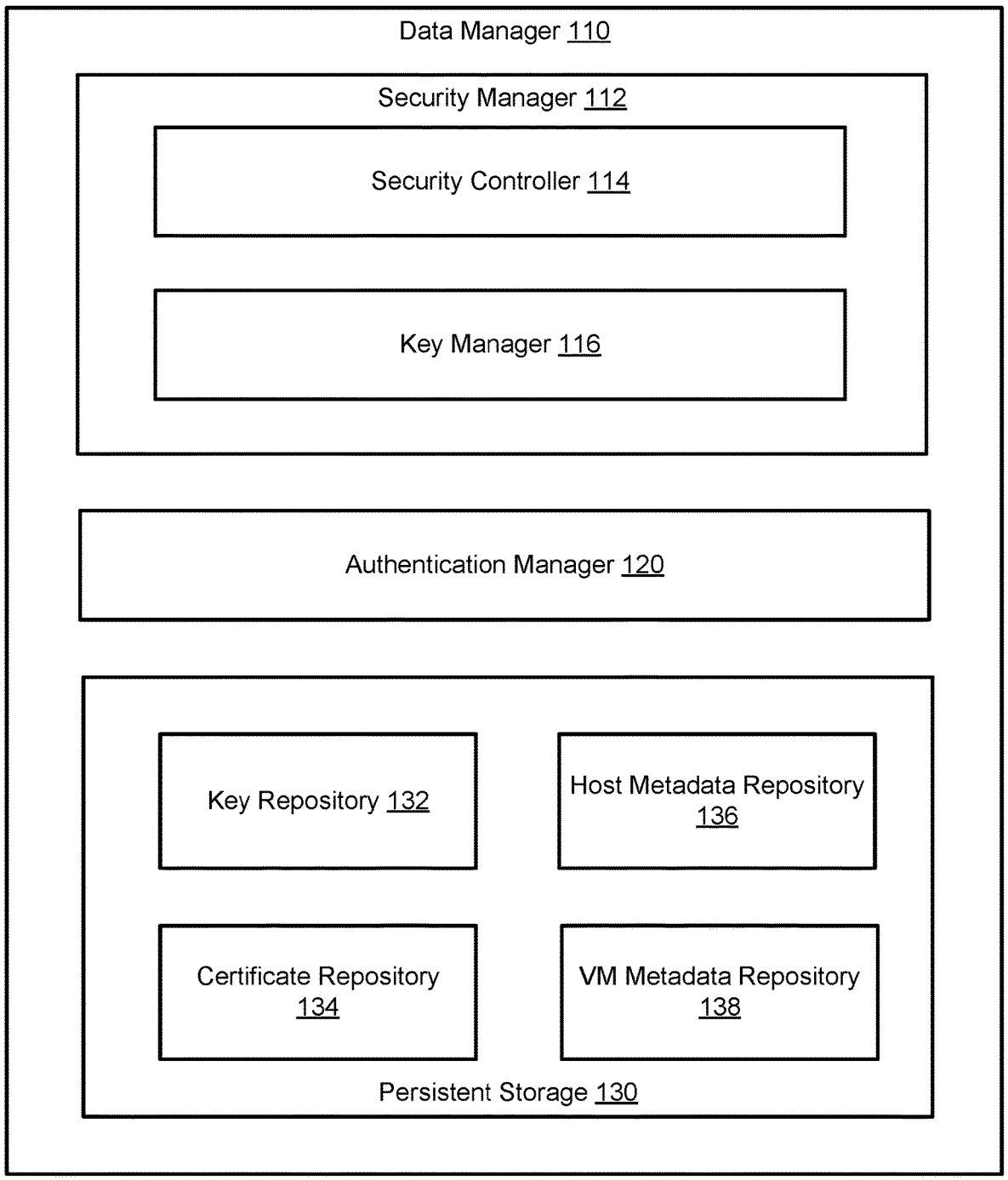
FIG. 1B shows a diagram of a data manager in accordance with one or more embodiments of the invention.

FIG. 1B shows a diagram of a data manager in accordance with one or more embodiments of the invention. The data manager (110) may be an embodiment of the data manager (110, FIG. 1A) discussed above. As discussed above, the data manager (110) includes the functionality to provide VM management and security services. To provide the aforementioned functionality, the data manager (110) includes a security manager (112), an authentication manager (120), and persistent storage (130). The data manager (110) may include additional, fewer, and/or different components without departing from the invention. Each of the aforementioned components of the data manager (110) is discussed below.

In one or more embodiments of the invention, the security manager (112) is implemented using a computing device. The computing device may be, for example, a mobile phone, tablet, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the security manager (112) described through this application and all, or a portion, of the methods illustrated in FIGS. 3A-3C. The security manager (112) may be implemented using other types of computing devices without departing from the invention. For additional details regarding computing devices, refer to FIG. 5.

In one or more embodiments of the invention, the security manager (112) is implemented as a logical device. The logical device may utilize the computing resources of any number of computing devices and thereby provide the functionality of the security manager (112) described throughout this application and/or all, or a portion thereof, of the methods illustrated in FIGS. 3A-3C.

In one or more embodiments of the invention, the security manager (112) provides the VM movement and security services. The VM movement and security services may include: (i) obtaining VM metadata and host metadata (both discussed below), (ii) determining whether hosts (100, FIG. 1A) are registered with the data manager (110), (iii) permitting movement of VMs between hosts (100, FIG. 1A), and (iv) initiating encryption of communication channels between VMs and hosts (100, FIG. 1A). To provide the aforementioned functionality, security manager may include a security controller (114) and a key manager (116). Each of these components of the security manager (112) is discussed below. The security manager (112) may provide other and/or additional services without departing from the invention.

In one or more embodiments of the invention, the security controller (114) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the security controller (114) described throughout this application and/or all or a portion of the methods illustrated in FIGS. 3A-3C. The security controller (114) may be implemented using another type of physical device without departing from the invention.

Figure 3A:
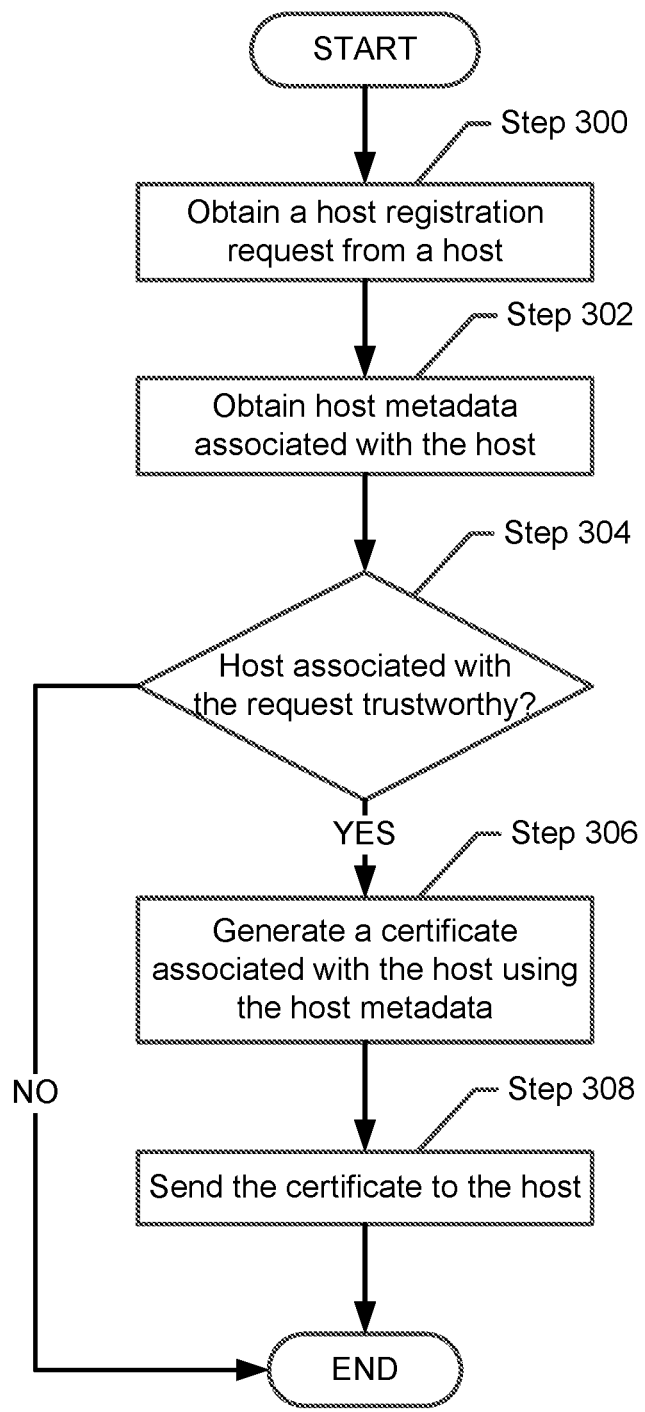
FIG. 3A shows a flowchart of a method for registering a host in accordance with one or more embodiments of the invention.
Figure 3B:
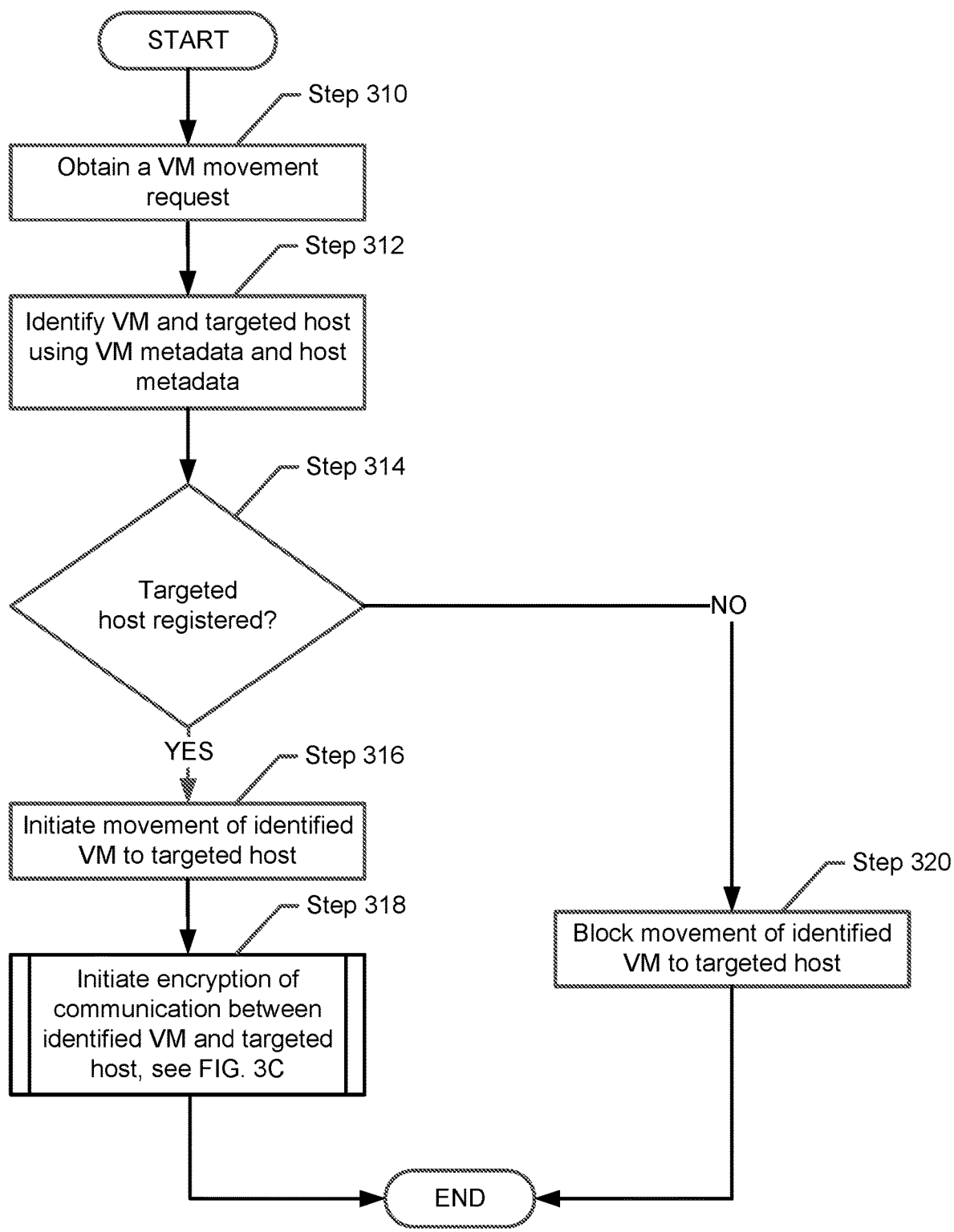
FIG. 3B shows a flowchart of a method for securing the movement of virtual machines between hosts in accordance with one or more embodiments of the invention.
Figure 3C:
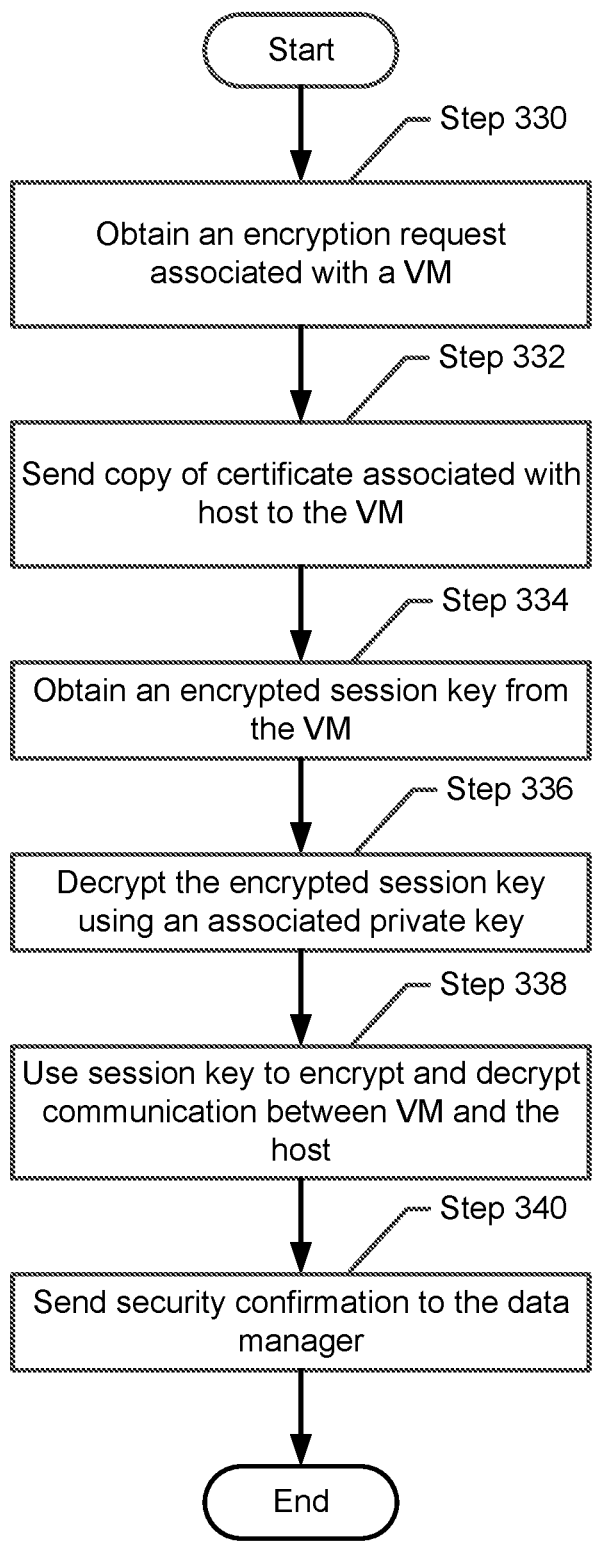
FIG. 3C shows a flowchart of a method for establishing an encrypted communication channel between a virtual machine and a host in accordance with one or more embodiments of the invention.

The security controller (114) may be implemented using computer instructions (e.g. computer code) stored on a persistent storage that when executed by a processor of the security manager (112) cause the security manager (112) to provide the functionality of the security controller (114) described throughout this application and/or all or a portion of the methods illustrated in FIGS. 3A-3C.

The security controller (114) may provide VM security services to the hosts (100). The VM security services may include: (i) obtaining VM movement request, (ii) identifying VMs and hosts (100, FIG. 1A) associated with VM movement requests, (iii) maintaining a VM metadata repository and a host metadata repository, (iv) preventing the movement of VMs between hosts (100, FIG. 1A), (v) initiating the movement of VMs, and (vii) initiating the encryption of communication channels between VMs and hosts (100, FIG. 1A). The security controller (114) may provide other and/or additional services without departing from the invention.

In one or more embodiments of the invention, the key manager (116) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the key manager (116) described throughout this application and/or all or a portion of the methods illustrated in FIG. 3A. The key manager (116) may be implemented using another type of physical device without departing from the invention.

The key manager (116) may be implemented using computer instructions (e.g. computer code) stored on a persistent storage that when executed by a processor of the security manager (112) cause the security manager (112) to provide the functionality of the key manager (116) described throughout this application and/or all or a portion of the methods illustrated in FIG. 3A.

The key manager (116) may provide key management services. The key management services may include generating and assigning public keys (discussed below) associated with hosts (e.g., 100A, 100B, FIG. 1A) of the hosts (100, FIG. 1A). The key manager (116) may generate a public key using at least a portion of host metadata (e.g., a host identifier) associated with a host (e.g., 100A, FIG. 1A) and a cryptographic algorithm A cryptographic algorithm may be one or more mathematical instructions used to encrypt or decrypt data. The key manager (116) may update and/or maintain the public key repository based on generated public keys. The key manager (116) may maintain a list of generated public keys and may include host identifiers that are associated with the generated public keys. The key manager (116) may provide other and/or additional services without departing from the invention.

In one or more embodiments of the invention, the authentication manager (120) is implemented using a computing device. The computing device may be, for example, a mobile phone, tablet, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the authentication manager (120) described through this application and all, or a portion, of the methods illustrated in FIGS. 3A-3B. The authentication manager (120) may be implemented using other types of computing devices without departing from the invention. For additional details regarding computing devices, refer to FIG. 5.

In one or more embodiments of the invention, the authentication manager (120) is implemented as a logical device. The logical device may utilize the computing resources of any number of computing devices and thereby provide the functionality of the authentication manager (120) described throughout this application and/or all, or a portion thereof, of the methods illustrated in FIGS. 3A-3B.

In one or more embodiments of the invention, the authentication manager (120) provides authentication services. The authentication services may include: (i) determining whether hosts (100, FIG. 1A) are trustworthy, (ii) generating certificates, (iii) maintaining a certificate repository, and (iv) determining whether a host (e.g., 100A, FIG. 1A) is registered. The authentication manager (120) may provide other and/or additional services without departing from the invention.

The data manager (110) and the components therein may use data structures stored in a persistent storage (130) of the data manager (110). The persistent storage (130) may be implemented using one or more physical storage devices and/or logical storage devices.

The persistent storage (130) may be implemented using a physical storage. The physical storage may include any combination of hard disk drives, solid state disk drives, tape drives, and/or any other physical storage mediums for the storage of data. The persistent storage (130) may be another type of physical storage without departing from the invention.

The persistent storage (130) may be implemented using a logical storage (e.g., virtualized storage) that utilizes any quantity of hardware storage resources of any number of computing devices for storing data. For example, the persistent storage (130) may utilize portions of any combination of hard disk drives, solid state disk drives, tape drives, and/or any other physical storage medium of any number of computing devices. The persistent storage (130) may be another type of storage without departing from the invention.

In one or more embodiments of the invention, the persistent storage (130) stores data. The data may include one or more data structures. The persistent storage (130) may include a key repository (132), a certificate repository (134), a host metadata repository (136), and a VM metadata repository (138). Each of these data structures is discussed below. The persistent storage (130) may store other and/or additional data without departing from the invention.

In one or more embodiments of the invention, the key repository (132) includes one or more data structures that include public and private keys pairs. The key repository (132) may also include a list of host identifiers that are associated with the public and private keys pairs. The public and private keys pairs may be generated using any known mechanism for generating public-private key pairs. As discussed above, each host registered with the data manager (110) may be associated with a public and private key pair. When a host registers with the data manager, the key manager of the data manager generates a public and private key pair associated with host using host metadata. The public and private key pair to establish an encrypted communication channel between VMs hosted by the host and the host itself. The key repository may include other and or additional information without departing from the invention.

In one or more embodiments of the invention, the certificate repository (134) includes one or more data structures that include certificates. Each certificate may be a data structure that includes a copy of a public key for of host, host metadata, an authentication manager identifier (i.e., an identifier of the entity that generated the certificate), and a signature. The signature may be generated by hashing the copy of a public key for of host, host metadata, an authentication manager identifier to generate a hash value. The generated hash value is subsequently encrypted using the private key of the authentication manager. When a host (e.g., 100A, FIG. 1A) is registered with the data manager (110), the authentication manager (120) generates a certificate that is associated with the host (e.g., 100A, FIG. 1A). The certificate repository (134) may be updated and maintained by the authentication manager (120). The certificates may be used the authentication manager to determine whether a host is registered and may be used by hosts to establish an encrypted communication channel between VMs and hosts. The certificate repository (134) may include other and/or additional information without departing from the invention. For additional information regarding the certificate repository (134), refer to FIG. 2.

In one or more embodiments of the invention, the host metadata repository (136) may be one or more data structures that include host metadata. The host metadata repository (136) may include host metadata associated with each host (e.g., 100A, 100B, FIG. 1A) that is registered with the data manager (110). The host metadata may include a host identifier, host hypervisor information, and other and/or additional information regarding each registered host without departing from the invention. A host identifier may be used to differentiate a particular host (e.g., 100A, FIG. 1A) from the hosts (100, FIG. 1A). A host identifier may be a unique global bit string or character string that is associated with a particular host (e.g., 100A, FIG. 1A). The host hypervisor information may include an hypervisor type, hypervisor configuration information, and/or other information associated with the hypervisors of hosts (100, FIG. 1A). The host metadata repository (136) may also include a list of trustworthy hosts obtained and verified from a third party entity not shown in the system depicted in FIG. 1A. The hosts (100, FIG. 1A) associated with the aforementioned list have been confirmed to be trustworthy by the third party entity and may be registered with the data cluster (110). The host metadata repository (136) may include other and/or additional information regarding the hosts (100, FIG. 1A) without departing from the invention.

In one or more embodiments of the invention, the VM metadata repository (138) may be one or more data structures that include information regarding VMs hosted by the hosts (100, FIG. 1A). The VM metadata repository may include VM metadata associated with each VM hosted on the hosts (100, FIG. 1A). The VM metadata may include VM identifiers, host identifiers associated with hosts on which VMs are hosted, and a list of unsecured VMs. A VM identifier may be used to differentiate a particular VM from the VMs. A VM identifier may be a unique global bit string or character string that is associated with a particular VM. A host identifier may be used to differentiate a particular host (e.g., 100A, FIG. 1A) from the hosts (100, FIG. 1A). A host identifier may be a unique global bit string or character string that is associated with a particular host (e.g., 100A, FIG. 1A). The list of unsecured VMs may include the VM identifiers of VMs that do not include encrypted communication channels with the associated hosts.

The VM metadata repository (138) may also include a hierarchical listing of VMs for hosts that include nested VMs. In other words, the hierarchical listing may specify the VMs that may be nested in other VMs, where VMs are hosted within other VMs. The VM metadata repository (138) may be maintained and/or updated by the security controller (114) of the data manager (110). The VM metadata of the VM metadata repository (138) may be used to identify VMs associated with movement requests and to identify VMs that require the generation of an encrypted communication channel with the associated hosts. The VM metadata repository (138) may include other and/or additional information regarding the VMs without departing from the invention.

While the data structures (e.g., 132, 134, 136, 138) of the persistent storage (130) of the data manager (110) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in the persistent storage (130), any of the aforementioned data structures may be stored in different locations (e.g., in persistent storage of other computing devices, in memory rather than persistent storage, in a combination of memory and persistent storage, etc.) and/or spanned across any number of computing devices without departing from the invention. Any of the aforementioned data structures may be implemented using, for example, lists, tables, linked lists, databases, and/or other types of data structures.

Figure 1C:
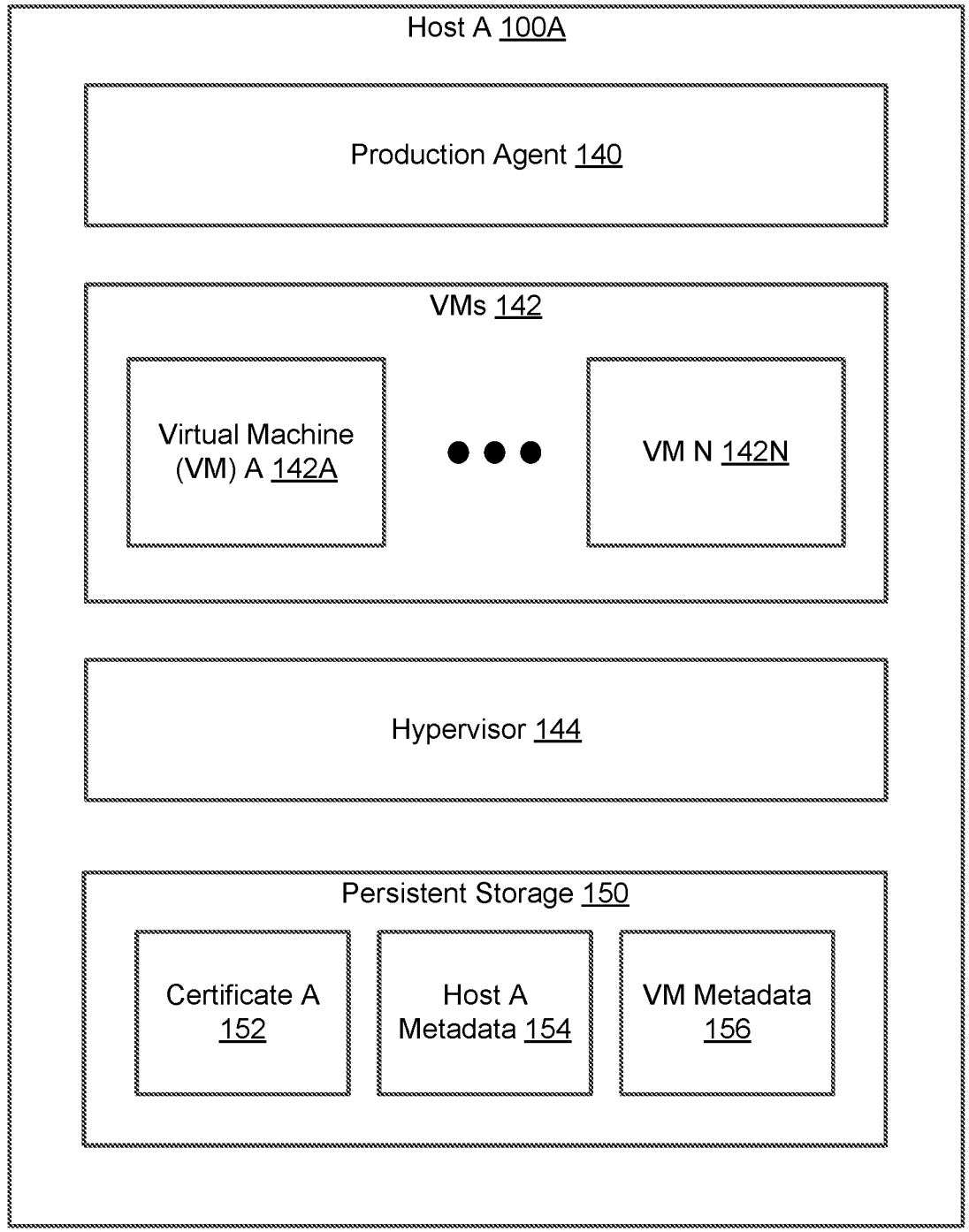
FIG. 1C shows a diagram of a host in accordance with one or more embodiments of the invention.

FIG. 1C shows a diagram of a host in accordance with one or more embodiments of the invention. The host (100A) may be an embodiment of host A (100A, FIG. 1A) discussed above. As discussed above, host A (100A) hosts virtual machines (VMs) (142). The VMs (142) may be logical entities executed using computing resources (not shown) of host (130). Each of the virtual machines (142A, 142N) may be performing similar or different processes. In one or more embodiments of the invention, the VMs (142) provide services to users, e.g., clients (not shown). For example, the VMs (142) may host components. The components may be, for example, instances of databases, email servers, and/or other applications. The VMs (142) may host other types of components without departing from the invention.

In one or more embodiments of the invention, host A (100A) includes a hypervisor (144) that orchestrates the operation of the VMs (142). The hypervisor (144) may orchestrate the operation of the VMs (142) by allocating computing resources to each virtual machine (142A, 142N).

Further, the hypervisor (144) may provide information about the virtual machines (142) of host A (100A) to the protection agent (140) as requested by the data manager (110), during periodic intervals, after a change in the system is detected by the hypervisor (144), and/or based on any other occurrence without departing from the invention.

In one or more embodiments of the invention, the hypervisor (144) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the hypervisor (144) described throughout this application.

In one or more of embodiments of the invention, the hypervisor (144) is implemented as computer instructions, e.g., computer code, stored on a persistent storage that when executed by a processor of host A (100A) cause host A (100A) to provide the functionality of the hypervisor (144) described throughout this application.

In one or more embodiments of the invention, host A (140) includes a production agent (140). A production agent (140) may include the functionality to perform communication and security services. The communication and security services performed by the production agent (140) may include: (i) obtaining VM metadata (156) and host A metadata (154) from host A (100A) and certificate A (152) from the data manager (110, FIG. 1A), (ii) providing the obtained VM metadata (156) and host A metadata (154) to the data manager (110, FIG. 1A), and (iii) generating an encrypted communication channel between host A (100A) and the VMs (142). The communication and security services performed by the production agent (140) may include other and/or additional services without departing from the invention.

In one or more embodiments of the invention, the production agent (140) communicate with the hypervisor (not shown) of host A (100A) using an existing channel (not shown). The existing channel may be used by the production agent (140) to obtain host A metadata (154) and VM metadata (156) and other and/or additional data without departing from the invention. The existing channel may be any type of communication channel that enables the production agent (140) to communicate with the hypervisor of host A (100A) without departing from the invention.

In one or more embodiments of the invention, the production agent (140) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the production agent (140) described throughout this application.

In one or more of embodiments of the invention, the production agent (140) is implemented as computer instructions, e.g., computer code, stored on a persistent storage that when executed by a processor of host A (100A) cause the host A (100A) to provide the functionality of the production agent (140) described throughout this application.

In one or more of embodiments of the invention, the virtual machines (142) are implemented as computer instructions, e.g., computer code, stored on a persistent storage (e.g., on host A (100A)) that when executed by a processor(s) of host A (100A) cause host A (100A) to provide the functionality of the virtual machines (142) described throughout this application.

Host A (100A) and the components therein may use data structures stored in a persistent storage (150) of host A (100A). The persistent storage (150) may be implemented using one or more physical storage devices and/or logical storage devices.

The persistent storage (150) may be implemented using a physical storage. The physical storage may include any combination of hard disk drives, solid state disk drives, tape drives, and/or any other physical storage mediums for the storage of data. The persistent storage (150) may be another type of physical storage without departing from the invention.

The persistent storage (150) may be implemented using a logical storage (e.g., virtualized storage) that utilizes any quantity of hardware storage resources of any number of computing devices for storing data. For example, the persistent storage (150) may utilize portions of any combination of hard disk drives, solid state disk drives, tape drives, and/or any other physical storage medium of any number of computing devices. The persistent storage (150) may be another type of storage without departing from the invention.

In one or more embodiments of the invention, the persistent storage (150) stores data. The data may include one or more data structures. The persistent storage (150) may include certificate A (152), host A metadata (154), and VM metadata (156). Each of these data structures is discussed below. The persistent storage (150) may store other and/or additional data without departing from the invention.

In one or more embodiments of the invention, certificate A (152) is one or more data structures that is used to verify host A (100A) has been registered and to establish an encrypted communication channel between the VMs (142) and host A (100A). Certificate A (152) may include a public key, at least a portion of the host A metadata, and a authentication manager identifier (discussed below). Certificate A (152) may be generated and sent to host A (100A) by the authentication manager (120, FIG. 1B) of the data manager (110, FIG. 1B) when host A (100A) registered with the data manager (110, FIG. 1A). The production agent (140) may use certificate A (152) to establish an encrypted communication channel between the VMs (142) and host A (100A). The data manager (110, FIG. 1A) may use certificate A (152) to determine whether host A (100A) has registered. Certificate A may include other and/or additional information and may be used for other and/or additional purposes without departing from the invention.

In one or more embodiments of the invention, host A metadata (154) may be one or more data structures that include host metadata associated with host A (100A). Host A metadata (154) may include a host identifier, host hypervisor information, and other and/or additional information regarding host A (100A) without departing from the invention. The host hypervisor information may include an hypervisor type, hypervisor configuration information, and/or other information associated with the hypervisor of host A (100A, FIG. 1A). Host A metadata (154) may be used by the data manager (154) to identify host A (100A) and to generate a certificate for host A (100A) upon registration. The host A metadata (154) may include other and/or additional information regarding host A (100A), and may be used for other and/or additional purposes without departing from the invention.

In one or more embodiments of the invention, the VM metadata (156) may be one or more data structures that include information regarding the VMs (142) hosted by host A (100A). The VM metadata (156) VM metadata associated with each VM hosted by host A (100A). The VM metadata may include VM identifiers, a host A identifier associated with host A (100A) on which VMs (142) are hosted, and a list of unsecured VMs. A VM identifier may be used to differentiate a particular VM from the VMs. A host identifier may be used to differentiate a particular host (e.g., 100A, FIG. 1A) from the hosts (100, FIG. 1A). The list of unsecured VMs may include the VM identifiers of VMs that do not include encrypted communication channels with the associated hosts. The VM metadata (156) may also include a hierarchical listing of VMs (142) if host A (100A) includes nested VMs. In other words, the hierarchical listing may specify the VMs (e.g., 142B) that are nested in other VMs (e.g., 142A), wherein VMs (e.g., 142B) are hosted within other VMs (142A). The VM metadata (156) may be sent to the data manager (110, FIG. 1A) by the production agent (140). The VM metadata (156) may be used to identify VMs (142) hosted by host A (100A) that may be associated with movement requests and to identify VMs (142) hosted by host A (100A) that require the generation of an encrypted communication channel with host A (100A). The VM metadata (156) may include other and/or additional information regarding the VMs (142) hosted by host A (100A) without departing from the invention.

While the data structures (e.g., 152, 154, 156) of the persistent storage (150) of host A (100A) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in the persistent storage (150), any of the aforementioned data structures may be stored in different locations (e.g., in persistent storage of other computing devices, in memory rather than persistent storage, in a combination of memory and persistent storage, etc.) and/or spanned across any number of computing devices without departing from the invention. Any of the aforementioned data structures may be implemented using, for example, lists, tables, linked lists, databases, and/or other types of data structures.

Figure 2:
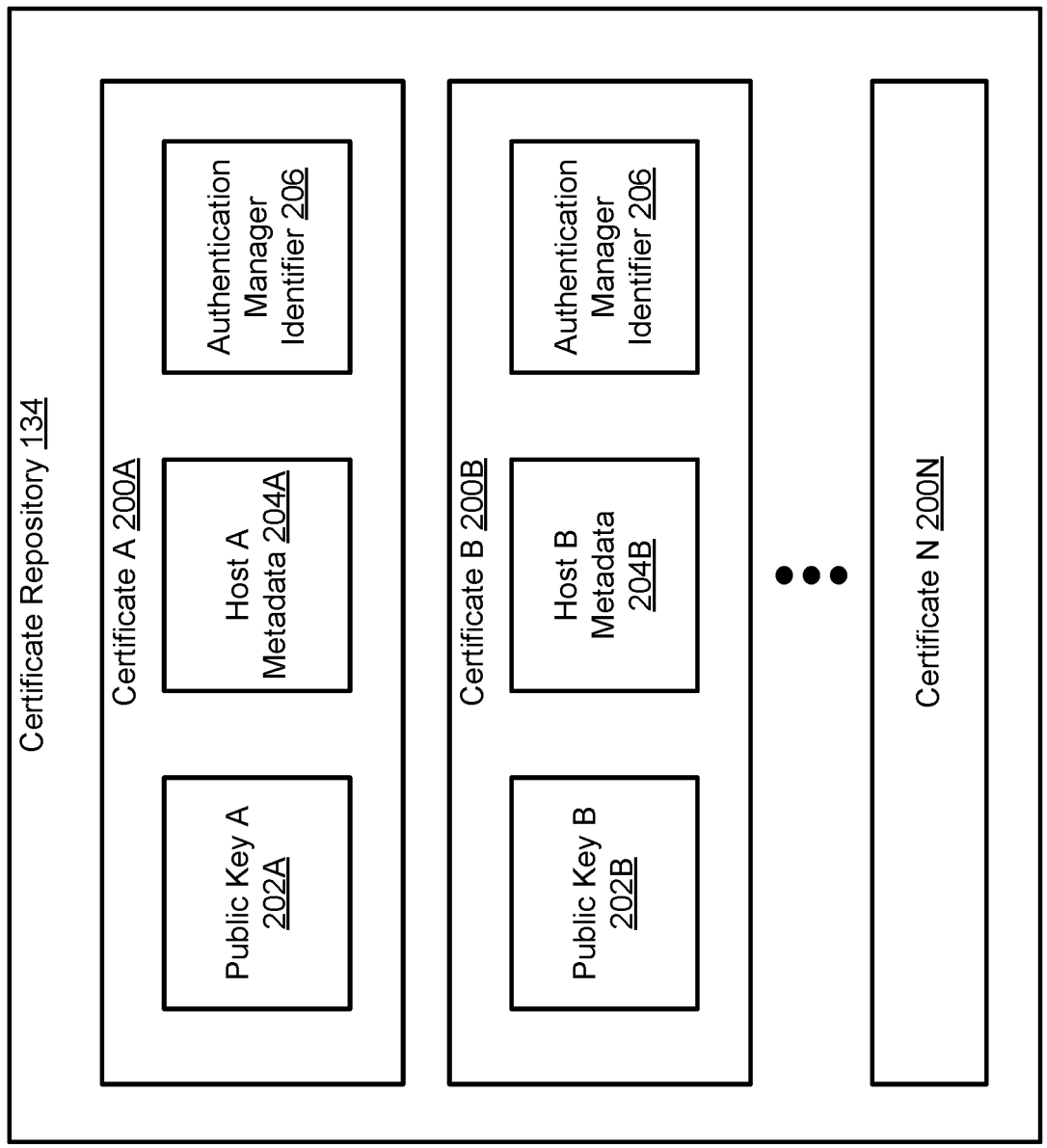
FIG. 2 shows a diagram of a certificate repository in accordance with one or more embodiments of the invention.

FIG. 2 shows a diagram of a certificate repository in accordance with one or more embodiments of the invention. The certificate repository (134) may be an embodiment of the certificate repository (134, FIG. 1B) discussed above. As discussed above, the certificate repository (134) may include one or more certificates, e.g., certificate A (200A), certificate B (200B), and certificate N (200N). Each certificate (e.g., 200A, 200B, 200N) may be associated with a host (e.g., 100A, 100N). Each certificate may include a public key (e.g., public key A (202A), public key B (202B), and public key N (202N)), host metadata (e.g., host A metadata (204A), host B metadata (204B), and host N metadata (204N)), and an authentication manager identifier (206). Each of these components is discussed below. A certificate (e.g., 200A, 200B, 200N) of the certificate repository may include other and/or additional information without departing from the invention.

As discussed above, a public key (e.g., 202A, 202B) may be a unique code that is associated with a host (e.g., 100A, FIG. 1A). The unique code may be a unique bit string or character string. As discussed above, each host registered with the data manager (110) may be associated with a public key (e.g., 202A, 202B), and each certificate (e.g., 200A, 200B, 200N) may include a public key (e.g., 202A, 202B). When a host registers with the data manager, the key manager of the data manager generates a public key (e.g., 202A, 202B) associated with host using host metadata and a cryptographic algorithm Public keys (e.g., 202A, 202B) may be used by the hosts associated with the keys to generate an encrypted communication channel between VMs hosted by the host and the host itself. The public keys (e.g., 202A, 202B) may include other and or additional information and may be used for other and/or additional purposes without departing from the invention.

Host metadata (e.g., 204A, 204B) may be one or more data structures that include host metadata associated with a host (e.g., 100A, 100B, FIG. 1A). Host metadata (e.g., 204A, 204B) may include a host identifier, host hypervisor information, and other and/or additional information regarding a host (e.g., 100A, 100B, FIG. 1A) without departing from the invention. The host hypervisor information may include an hypervisor type, hypervisor configuration information, and/or other information associated with the hypervisor of a host (e.g., 100A, 100B). Host metadata (e.g., 204A, 204B) may be used by the data manager (110) to identify a host e.g., 100A, 100B, FIG. 1A) associated with a certificate (e.g., 200A, 200B, 200N) and to generate a session key associated with a host (e.g., 100A, 100B, FIG. 1A). The host metadata (e.g., 204A, 204B) may include other and/or additional information regarding a host (e.g., 100A, 100B, FIG. 1A), and may be used for other and/or additional purposes without departing from the invention.

The authentication manager identifier (206) may be one or more data structures that may be used by hosts or VMs to verify that a certificate was generated by the authentication manager (120, FIG. 1B) of the data manager (110, FIG. 1A) and is trustworthy. Each certificate (e.g., 200A, 200B, 200C) may have an authentication manager identifier (206). The authentication manager identifier (206) may be a unique global bit string or character string that is associated with the authentication manager (120, FIG. 1B). A certificate without the authentication manager identifier (206) or an incorrect authentication identifier (206) may be an untrustworthy certificate and may not be used by hosts (e.g., 100A, 100B, FIG. 1A). The authentication manager identifier (206) may include other and/or additional information and may be used for other and/or additional purposes without departing from the invention.

While the data structures (e.g., 200A, 202A, 204A, 206) of the certificate repository (134) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in the certificate repository (134), any of the aforementioned data structures may be stored in different locations (e.g., in persistent storage of other computing devices, in memory rather than persistent storage, in a combination of memory and persistent storage, etc.) and/or spanned across any number of computing devices without departing from the invention. Any of the aforementioned data structures may be implemented using, for example, lists, tables, linked lists, databases, and/or other types of data structures.

FIGS. 3A-3C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3C may be performed in parallel with any other steps shown in FIGS. 3A-3C without departing from the scope of the invention.

FIG. 3A shows a flowchart of a method for registering a host in accordance with one or more embodiments of the invention. The method shown in FIG. 3A may be performed by, for example, a data manager (110, FIG. 1A). Other components of the system in FIG. 1A may perform the method of FIG. 3A without departing from the invention.

Turning to FIG. 3A, in step 300, a registration request is obtained from a host. In one or more embodiments of the invention, the host may send a message to the data manager. The message may include a registration request. The registration request may include a host identifier to specify the host associated with the registration request. The registration request may be obtained from a host via other and/or additional methods without departing from the invention.

In step 302, host metadata associated with the host is obtained. In one or more embodiments of the invention, the host metadata is obtained from the host associated with the registration. The security controller of the data manager may identify the host associated with the registration request based on the host identifier included in the registration request. The security controller of the data manager may send a message to the host. The message may include a request for host metadata associated with the host. In response to the request, the host may send the requested host metadata to the security controller of the data manager. Host metadata associated with the host may be obtained via other and/or additional methods without departing from the invention.

In step 304, a determination is made as to whether the host associated with the request is trustworthy. In one or more embodiments of the invention, the authentication manager of the data manager uses the list of trustworthy hosts of the host metadata repository to determine whether the host associated with the registration request is trustworthy. As discussed above, the list of trustworthy hosts may be obtained from a verification entity not depicted in the system illustrated in FIG. 1A. The list of trustworthy hosts may include host identifiers that were verified by the verification entity that may be trusted by the data manager. The authentication manager of the data manager may compare the host identifiers included in the list of trustworthy hosts with the host identifier of the host associated with the registration request.

If the host identifier of the host associated with the registration request matches a host identifier included in the list of trustworthy hosts, then the authentication manager of the data manager may determine that the host associated with the registration request is trustworthy. If the host identifier of the host associated with the registration request does not match a host identifier included in the list of trustworthy hosts, then the authentication manager of the data manager may determine that the host associated with the registration request is not trustworthy. A determination may be made as to whether the host associated with the registration request is trustworthy via other and/or additional methods without departing from the invention.

If it is determined that the host associated with the request is trustworthy, then the method proceeds to step 306. If it is determined that the host associated with the request is not trustworthy, then the method ends following step 304.

In step 306, a certificate associated with the host is generated using the host metadata. In one or more embodiments of the invention, generating the certificate includes generating a public key and including both host metadata and an authentication manager identifier. The key manager of the data manager may generate the public key using the host identifier and an encryption key generation algorithm. The encryption key generation algorithm may be any encryption key generation algorithm that generates public keys using a host identifier. The authentication manager of the data manager may include the generated public key in the certificate. The security controller of the data manager may include at least a portion of the host metadata obtained from the host with the public key in the certificate. The authentication manager of the data manager may also include an authentication identifier in the certificate to verify the certificate was generated by the authentication manager of the data manager. A certificate associated with the host may be generated using host metadata via other and/or additional methods without departing from the invention.

In step 308, the certificate is sent to the host. In one or more embodiments of the invention, the security controller of the data manager sends a message to the host. The message may include the certificate. The security controller may, prior to sending the certificate to the host, store a copy in the certificate repository of the persistent storage of the data manager. The certificate may be sent to the host via other and/or additional methods without departing from the invention. The method may end following step 308.

FIG. 3B shows a flowchart of a method for securing the movement of virtual machines between hosts in accordance with one or more embodiments of the invention. The method shown in FIG. 3B may be performed by, for example, a data manager (110, FIG. 1A). Other components of the system illustrated in FIG. 1A may perform the method of FIG. 3B without departing from the invention. This method may result in the secure movement of VMs to registered hosts and may prevent the movement of VMs to unregistered hosts, thereby greatly increasing the security of the VMs.

Turning to FIG. 3B, in step 310, a VM movement request is obtained. In one or more embodiments of the invention, a host sends a message to the data manager. The message may include a request to move a VM to a host. The VM movement request may include a VM identifier and a host identifier associated with the targeted host. A VM movement request may be obtained via other and/or additional methods without departing from the invention.

In step 312, a VM and a targeted host are identified using VM metadata and host metadata. As discussed above, the VM movement request may include a VM identifier associated with the VM to be moved and a host identifier associated with the targeted host. The security controller of the data manager may compare the VM identifier with the VM identifiers included in the VM metadata repository to identify the VM that is associated with the VM movement request. The security controller of the data manager may compare the host identifier with the host identifiers included in the host metadata repository to identify the targeted host associated with the VM movement request. A VM and a targeted host may be identified using VM metadata and host metadata via other and/or additional methods without departing from the invention.

In step 314, it is determined whether the targeted host is registered. In one or more embodiments of the invention, the authentication manager of the data manager uses the certificate repository to determine whether the targeted host is registered. The authentication manager may compare the host identifiers included in the host metadata in each certificate included in the certificate repository with the host identifier associated with the targeted host as the registration of a host may include the generation of a certificate associated with the host. If the host identifier associated with the targeted host matches a host identifier included in the host metadata of a certificate of the certificate repository, then the authentication manager of the data manager may determine that the targeted host is registered. If the host identifier associated with the targeted host does not match a host identifier included in the host metadata of a certificate of the certificate repository, then the authentication manager of the data manager may determine that the targeted host is not registered. It may be determined whether the targeted host is registered via other and/or additional methods without departing from the invention.

If it is determined that the targeted host is registered, then the method proceeds to step 316. If it is determined that the targeted host is not registered, then the method proceeds to step 320.

In step 316, the movement of the identified VM to the targeted host is initiated. In one or more embodiments of the invention, the security controller of the data manager sends a message to the host hosting the identified VM. The security controller may identify the host hosting the identified VM using VM metadata associated with the identified VM. The VM metadata may include a host identifier associated with the host hosting the identified VM. The message may include a request to move the identified VM to the targeted host. In response to the request, the identified VM may be moved to the targeted host. After the movement of the identified VM to the targeted host, the security controller of the data manager may update the VM metadata associated with the identified VM to indicate that the identified VM is not secured. The movement of the identified VM to the targeted host may be initiated via other and/or additional methods without departing from the invention.

In step 318, the encryption of communication between the identified VM and the targeted host is initiated. The security controller of the data manager may identify that the identified VM is not secured on the targeted host based on the VM metadata associated with the identified VM. As a result, the security controller of the data manger may send a message to the targeted host. The message may include a request to encrypt the communication between the identified VM and the targeted host to secure the VM. As a result, the production agent of the targeted host may encrypt the communication between the VM and the targeted host. For additional information regarding encrypting the communication between a VM and a host, refer to FIG. 3C. The encryption of communication between the identified VM and the targeted host may be initiated via other and/or additional methods without departing from the invention. The method may end following step 318.

In step 320, the movement of the identified VM to the targeted host is blocked. Following the determination in step 316 that the targeted host is not registered, the security controller of the data manager may not initiate the movement of the identified VM. The security controller of the data manager may send a message to the targeted host and/or the host from which the VM movement request originated. The message may indicate that the movement of the identified VM has been blocked. The movement of the identified VM to the targeted host may be blocked via other and/or additional methods without departing from the invention. The method may end following step 320.

FIG. 3C shows a flowchart of a method for establishing an encrypted communication channel between a virtual machine and a host in accordance with one or more embodiments of the invention. The method shown in FIG. 3C may be performed by, for example, a production agent (140, FIG. 1C) of a host. Other components of the system illustrated in FIG. 1A may perform the method of FIG. 3C without departing from the invention. This method results in the generation of an encrypted communication channel between a VM and the host hosting the VM, which may greatly increase the security of the VM and mitigate the risk of malicious actions associated with the VM.

In step 330, an encryption request associated with a VM is obtained. In one or more embodiments of the invention, the production agent of a host obtains an encryption request from the data manager. The data manager may send a message to the production agent of the host. The message may include a request to encrypt the communication between the VM and the host. The encryption request may include a VM identifier associated with the VM. An encryption request associated with a VM may be obtained via other and/or additional methods without departing from the invention.

In step 332, a copy of the certificate associated with the host is sent to the VM. The production agent of the host may use the VM identifier included in the encryption request to identify the VM associated with the request. The production agent of the host may then generate a copy of the certificate associated with the host. The production agent of the host may send the copy of the certificate to the identified VM. A copy of the certificate associated with the host may be sent to the VM via other and/or additional methods without departing from the invention.

In step 334, an encrypted session key is obtained from the VM, where the encrypted session key is generated encrypting a session key with the public key in the aforementioned certificate. In response to obtaining the copy of the certificate, the VM (or a user of the VM (not shown)) may generate a session key using the public key, the host metadata, VM metadata associated with the VM, and a cryptographic algorithm. The VM (or a user of the VM) may then send a message to the production agent of the host. The session key is a symmetric key. The message may include the encrypted session key. The encrypted session key may be obtained from the VM via other and/or additional methods without departing from the invention.

In step 336, the encrypted session key is decrypted using a private key corresponding to the public key in the aforementioned certificate. The production agent of the host may decrypt the session key using the private associated with the host, host metadata, VM metadata and a cryptographic algorithm. As a result, the production agent may be able to use the session key to encrypt and decrypt communication between the host and the VM.

In step 338, the session key is used to encrypt and decrypt communication between the VM and the host. As discussed above, the session key may be used by the production agent and the VM to generate an encrypted communication channel and secure the communication between the VM and the host. The production agent may encrypt all communication sent from the host to the VM using the session key and may decrypt all communication from the VM to the host using the session key. Only the VM and the production agent of the host may possess the session key. Encrypted data passed between the VM and the production agent may be unreadable without the session key to decrypt the encrypted data. The production agent may delete the session key when the VM is no longer hosted by the host. The session key may be used to encrypt and decrypt communication between the VM and the host via other and/or additional methods without departing from the invention.

In step 340, security confirmation is sent to the data manager. In one or more embodiments of the invention, the production agent of the host sends a message to the data manager. The message may indicate that an encrypted communication channel has been established between the VM and the host, and that the VM is now secured. In response to obtaining the message, the security controller of the data manager may update the VM metadata associated with the VM to indicate that the VM is secured. Security confirmation may be sent to the data manager via other and/or additional methods without departing from the invention.

Example

Figure 4A:
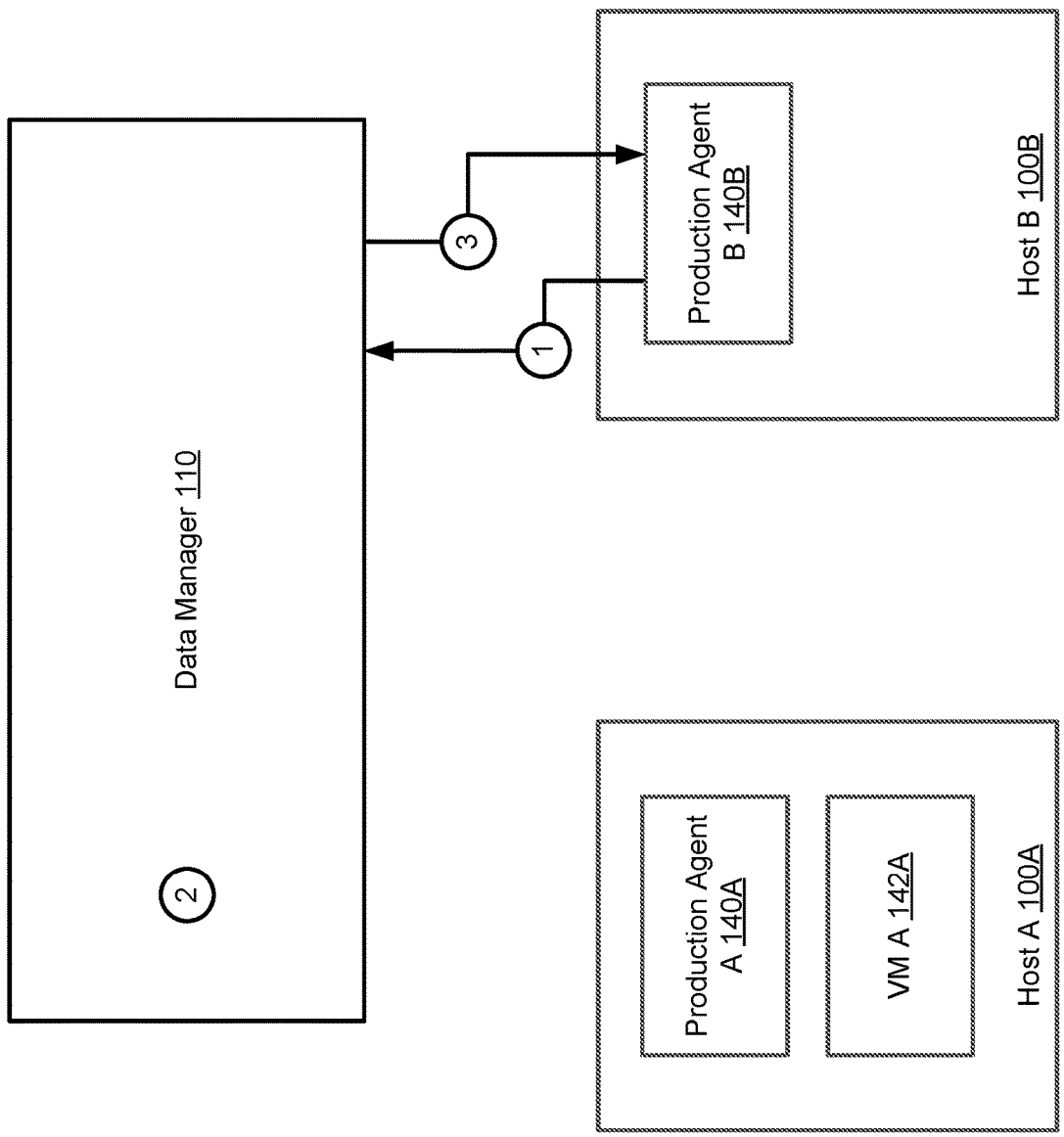
FIG. 4A shows a diagram of a first example in accordance with one or more embodiments of the invention.
Figure 4B:
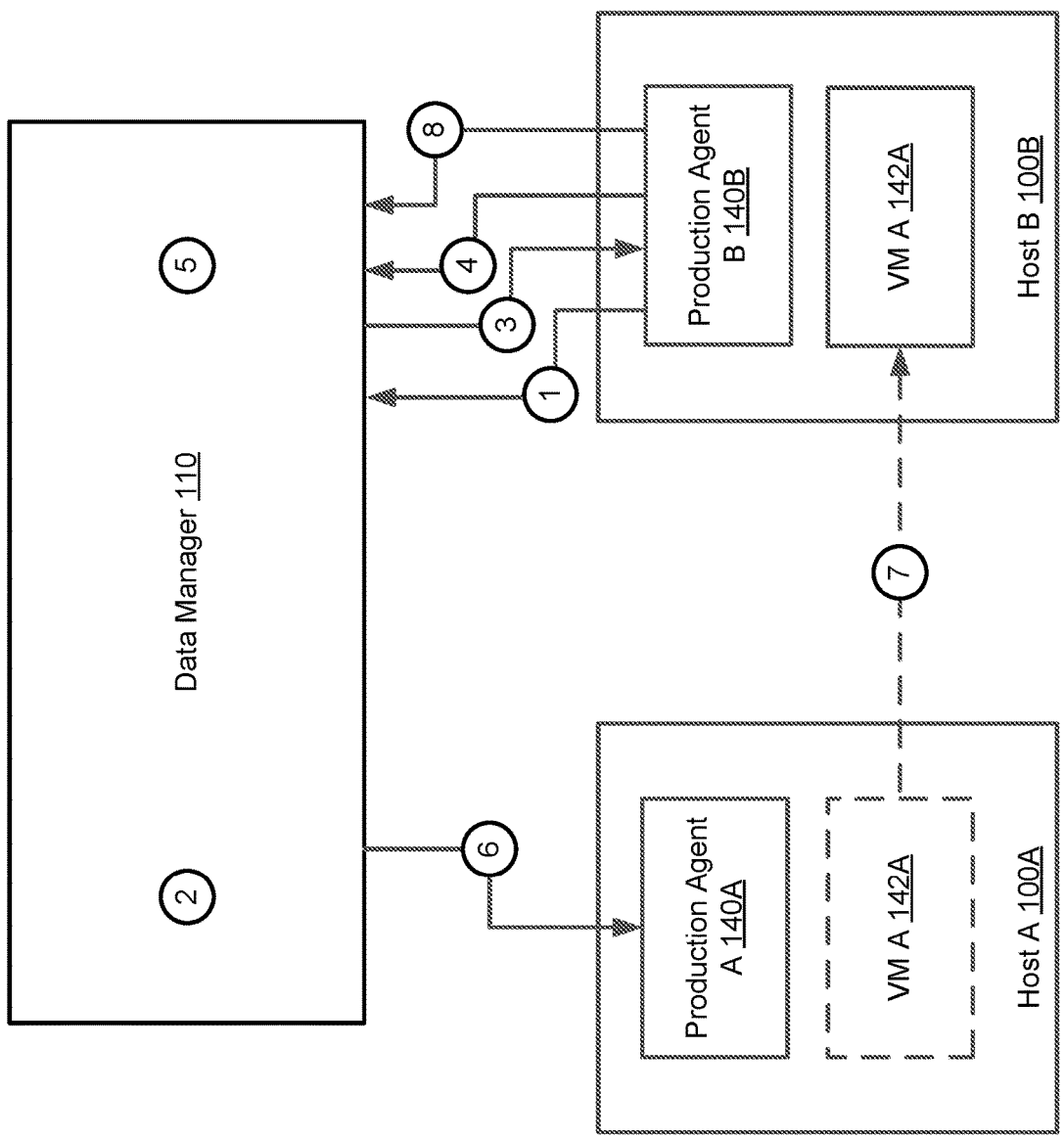
FIG. 4B shows a diagram of a second example in accordance with one or more embodiments of the invention.
Figure 4C:
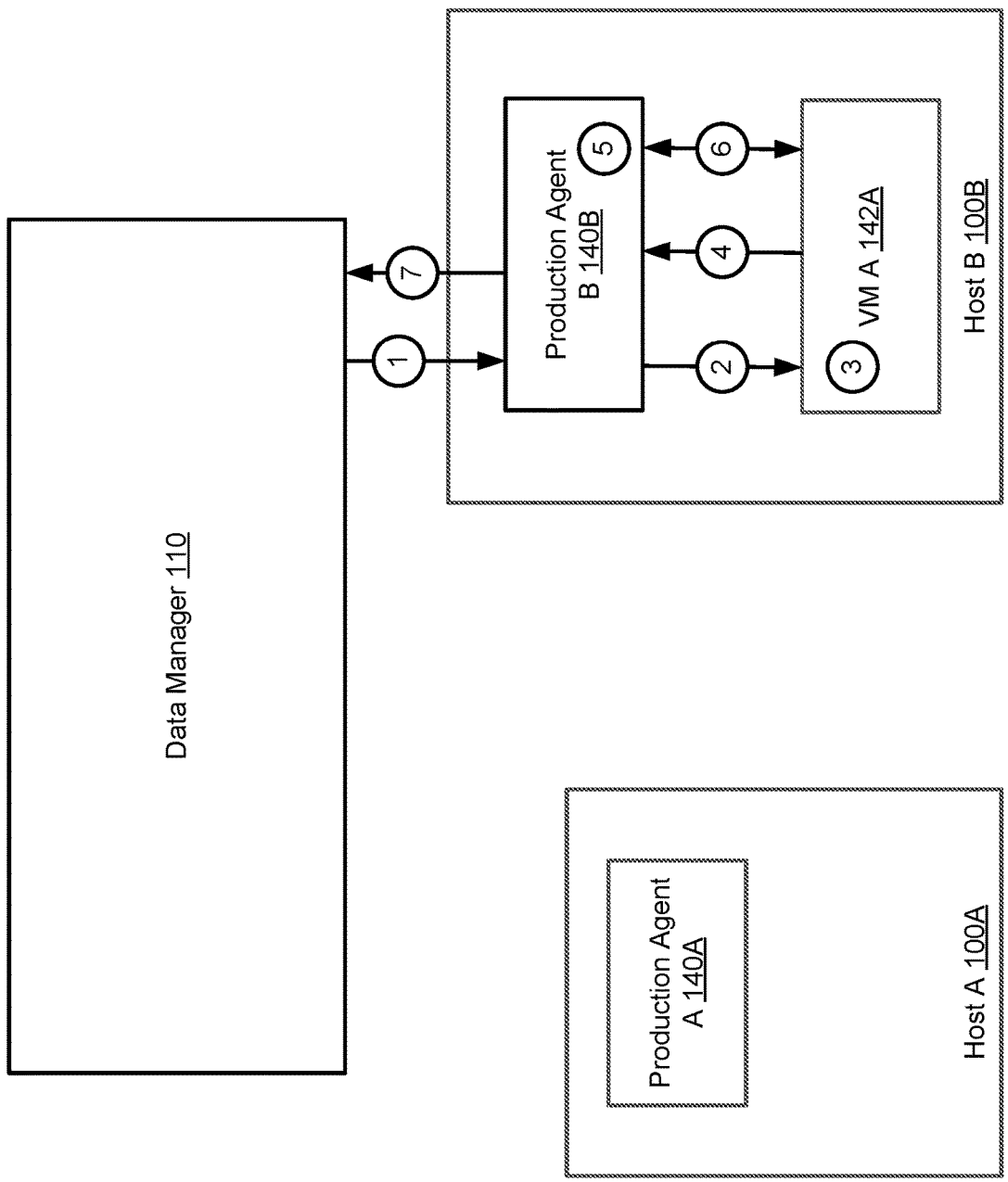
FIG. 4C shows a diagram of a third example in accordance with one or more embodiments of the invention.

The following section describes three examples. The examples are not intended to limit the invention. The examples are illustrated in FIGS. 4A-4C. Turning to the first example, consider a scenario in which a data manager manages the security and movement of VMs hosted by two hosts and an unregistered host attempts to host a VM.

FIG. 4A shows a diagram of a first example in accordance with one or more embodiments of the invention. As discussed above, the data manager (110) is managing the security and movement of VMs hosted by host A (100A) and host B (100B). Each host includes production agents. Host A (100A) includes production agent A (140A). Host B (100B) includes production agent B (140B). Production agent B (140B) of host B (100B) sends a VM movement request to the data manager (110) [1]. The VM movement request requests that VM A (142A) be moved from host A (100A) to host B (100B). The VM request includes host metadata associated with host B (100) and a VM A identifier associated with VM A (142A). The data manager (110) identifies the VM A (142A) as the VM to move and host B (100B) as the targeted host. The data manager (110) then checks the certificate repository (not shown) for a certificate associated with host B (100B).

The data manager (110) does not find a certificate associated with host B, and, therefore, determines that host B is not registered with the data manager (110) [2]. The data manager (110) then blocks the movement of VM A (142A) to host B (100B) and sends a notification to production agent B (140B) of host B (100B) indicating that the movement of VM A (142A) to host B (100B) has been blocked [3].

Turning to the second example, consider a scenario in which a data manager manages the security and movement of VMs hosted by two hosts. An unregistered host registers with the data manager and then requests to obtain a host. FIG. 4B shows a diagram of a second example in accordance with one or more embodiments of the invention. As discussed above, the data manager (110) is managing the security and movement of VMs hosted by host A (100A) and host B (100B). Each host includes production agents. Host A (100A) includes production agent A (140A). Host B (100B) includes production agent B (140B). Production agent B (140B) of host B (100B) sends a registration request to the data manager (110) [1]. The registration request includes host metadata. The data manager (110) then generates a certificate using the host metadata [2]. After generating the certificate, the data manager (110) sends a copy of the certificate to production agent B (140B) of host B (100B) [3].

After obtaining the copy of the certificate from the data manager (110), production agent B (140B) sends a VM movement request to the data manager (110) [4]. The VM movement request requests that VM A (142A) be moved from host A (100A) to host B (100B). The VM request includes host metadata associated with host B (100) and a VM identifier associated with VM A (142A). The data manager (110) identifies the VM A (142A) as the VM to move and host B (100B) as the targeted host. The data manager (110) then checks the certificate repository (not shown) for a certificate associated with host B (100B). The data manager (110) finds a certificate associated with host B (100B) and determines that host B (100B) is registered [5].

The data manager then sends a request to production agent A (140A) of host A (100A) initiating the movement of VM A (142A) from host A (100A) to host B (100B) [6]. In response to obtaining the request to move VM A (142A) to host B (100B), production agent B (140B) moves VM A (142A) to host B (100B) [7]. Then production agent B (140B) sends a notification to the data manager (110) notifying that VM A (142A) has been moved to host B (100B) and the data manager (110) updates the VM metadata associated with VM A (142A) based on the movement [8].

Turning to the third example, consider a scenario in which a data manager manages the security and movement of VMs hosted by two hosts. The an unsecured VM is secured. FIG. 4C shows a diagram of a third example in accordance with one or more embodiments of the invention. As discussed above, the data manager (110) is managing the security and movement of VMs hosted by host A (100A) and host B (100B). Each host includes production agents. Host A (100A) includes production agent A (140A). Host B (100B) includes production agent B (140B). The data manager (110) determines that VM metadata indicates that VM A (142A) is not secured on host B (100B) and sends an encryption request to production host B (140B) of host B (100B) [1]. In response to the encryption request, production host B (140) sends a copy of the certificate associated with host B (100B) to VM A (142A) [2].

After obtaining a copy of the certificate, VM A (142A) (or a user thereof) generates a session key [3]. VM A (142A) (or a user thereof) then encrypts the session key (using a public key included in the certificate) and sends the encrypted session key to production agent B (140B) [5]. After obtaining the encrypted session key, production agent B (140B) decrypts the encrypted session key using a private key corresponding to the aforementioned public key[5]. Production agent B (140B) and VM A (142A) then use the session key to encrypt and decrypt all communication between VM A (142A) and host A (100A) [6]. Production agent B (140B) then sends security confirmation to the data manager (110), and the data manager (110) updates the VM metadata to indicate that VM A (142A) is now secured [7].

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the security of VMs in a system. In one embodiment of the invention, the security is improved by a data manager that registers hosts in a system and permits the movement of VMs to registered hosts and blocks the movement of VMs to unregistered hosts. Embodiments of the invention further include a data manager initiating the generation of an encrypted communication channel between the VMs and their respective hosts. As a result, VMs may be safely moved between hosts in a system and the security of the VMs may be improved.

Thus, embodiments of the invention may address the problem of inefficient use of computing resources to move and secure VMs between hosts in a system. This problem arises due to the technological nature of the environment in which the VMs are hosted.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for securing movement of virtual machines (VMs) between hosts, the method comprising:
    obtaining a first VM movement request;
    in response to obtaining the first VM movement request:
        identifying a first VM of the VMs and a first targeted host of the hosts associated with the first VM movement request using VM metadata and host metadata, wherein the VM metadata comprises:
            VM identifiers associated with VMs comprising the first VM,
            host identifiers associated with hosts currently hosting the VMs,
            a list of unsecured VMs of the VMs, and
            a hierarchical listing of the VMs specifying nested VMs;
        making a first determination that the first targeted host is registered;
    in response to making the first determination:
        initiating the movement of the first VM to the first targeted host; and
        initiating, after the movement of the first VM, encryption of communication between the first VM and the first targeted host.

2. The method of claim 1, further comprising:
    obtaining a second VM movement request;
    in response to obtaining the second VM movement request:
        identifying a second VM of the VMs and a second targeted host of the hosts associated with the second VM movement request;
        making a second determination that the second targeted host is not registered; and
    in response to making the second determination:
        blocking the movement of the second VM to the second targeted host.

3. The method of claim 1, wherein the first targeted host is registered prior to obtaining the first VM movement request.

4. The method of claim 1, further comprising:
    obtaining a host registration request associated with the first targeted host;
    in response to obtaining the host registration request:
        making, using host metadata, a second determination that the first host is trustworthy; and
    in response to the second determination:
        generating a certificate associated with the first targeted host using the host metadata; and
        sending the certificate to the first targeted host,
    wherein the first determination is made, in part, using the certificate.

5. The method of claim 4, wherein the certificate comprises:
    a public key, and
    the host metadata.

6. The method of claim 1, wherein initiating the encryption of the communication between the first VM and the first targeted host comprises:
    sending an encryption request associated to the first targeted host;
    in response to the sending, obtaining a security confirmation from the first targeted host, wherein the security confirmation indicates that an encrypted communication channel has been established between the first VM and the first targeted host, wherein the first VM is executing on the first targeted host.

7. The method of claim 1, wherein identifying the first VM and the first targeted host comprises using the VM metadata and the host metadata.

8. A system, comprising:
a processor;
a data manager, which when executed by the processor performs a method, the method comprising:
obtaining a first VM movement request;
in response to obtaining the first VM movement request:
identifying a first VM of VMs and a first targeted host of hosts associated with the first VM movement request using VM metadata and host metadata, wherein
the VM metadata comprises:
VM identifiers associated with VMs comprising the first VM,
host identifiers associated with hosts currently hosting the VMs,
a list of unsecured VMs of the VMs, and
a hierarchical listing of the VMs specifying nested VMs;
making a first determination that the first targeted host is registered;
in response to making the first determination:
initiating the movement of the first VM to the first targeted host; and
initiating, after the movement of the first VM, encryption of communication between the first VM and the first targeted host.

9. The system of claim 8, wherein the method further comprising:
obtaining a second VM movement request;
in response to obtaining the second VM movement request:
identifying a second VM of the VMs and a second targeted host of the hosts associated with the second VM movement request;
making a second determination that the second targeted host is not registered; and
in response to making the second determination:
blocking the movement of the second VM to the second targeted host.

10. The system of claim 8, wherein the first targeted host is registered prior to obtaining the first VM movement request.

11. The system of claim 8, wherein the method further comprising:
obtaining a host registration request associated with the first targeted host;
in response to obtaining the host registration request:
making, using host metadata, a second determination that the first host 1s trustworthy; and
in response to the second determination:
generating a certificate associated with the first targeted host using the host metadata; and
sending the certificate to the first targeted host,
wherein the first determination is made, in part, using the certificate.

12. The system of claim 11, wherein the certificate comprises:
a public key, and
the host metadata.

13. The system of claim 8, wherein initiating the encryption of the communication between the first VM and the first targeted host comprises:

sending an encryption request associated to the first targeted host;
in response to the sending, obtaining a security confirmation from the first targeted host, wherein the security confirmation indicates that an encrypted communication channel has been established between the first VM and the first targeted host, wherein the first VM is executing on the first targeted host.

14. The system of claim 8, wherein identifying the first VM and the first targeted host comprises using the VM metadata and the host metadata.

15. A non-transitory computer readable medium comprising computer readable program code, which when executed by a computer processor enables the computer processor to perform a method, the method comprising:
obtaining a first VM movement request;
in response to obtaining the first VM movement request:
identifying a first VM of VMs and a first targeted host of hosts associated with the first VM movement request using VM metadata and host metadata, wherein
the VM metadata comprises:
VM identifiers associated with VMs comprising the first VM,
host identifiers associated with hosts currently hosting the VMs,
a list of unsecured VMs of the VMs, and
a hierarchical listing of the VMs specifying nested VMs;
making a first determination that the first targeted host is registered;
in response to making the first determination:
initiating the movement of the first VM to the first targeted host; and
initiating, after the movement of the first VM, encryption of communication between the first VM and the first targeted host.

16. The non-transitory computer readable medium of claim 15, wherein the method further comprising:
obtaining a second VM movement request;
in response to obtaining the second VM movement request:
identifying a second VM of the VMs and a second targeted host of the hosts associated with the second VM movement request;
making a second determination that the second targeted host is not registered; and
in response to making the second determination:
blocking the movement of the second VM to the second targeted host.

17. The non-transitory computer readable medium of claim 15, wherein the first targeted host is registered prior to obtaining the first VM movement request.

18. The non-transitory computer readable medium of claim 15, wherein the method further comprising:
obtaining a host registration request associated with the first targeted host;
in response to obtaining the host registration request:
making, using host metadata, a second determination that the first host is trustworthy; and
in response to the second determination:
generating a certificate associated with the first targeted host using the host metadata; and
sending the certificate to the first targeted host,
wherein the first determination is made, in part, using the certificate.

19. The non-transitory computer readable medium of claim 18, wherein the certificate comprises:
   a public key, and
   the host metadata.

20. The non-transitory computer readable medium of claim 15, wherein initiating the encryption of the communication between the first VM and the first targeted host comprises:
   sending an encryption request associated to the first targeted host;
   in response to the sending, obtaining a security confirmation from the first targeted host, wherein the security confirmation indicates that an encrypted communication channel has been established between the first VM and the first targeted host, wherein the first VM is executing on the first targeted host.

\* \* \* \* \*

UNITED STATES PATENT AND TRADEMARK OFFICE
CERTIFICATE OF CORRECTION

PATENT NO. : 11,645,103 B2
APPLICATION NO. : 16/936465
DATED : May 9, 2023
INVENTOR(S) : Suren Kumar et al.

It is certified that error appears in the above-identified patent and that said Letters Patent is hereby corrected as shown below:

In the Claims

Claim 11, Column 21, Line 54, the words "1s" should instead be -- is --.

Signed and Sealed this
Twelfth Day of September, 2023

Katherine Kelly Vidal
*Director of the United States Patent and Trademark Office*